United States Patent
Chen et al.

(10) Patent No.: US 7,577,716 B2
(45) Date of Patent: Aug. 18, 2009

(54) SYSTEM AND METHOD FOR DISPLAYING INFORMATION ON PORTS OF NETWORK DEVICES

(75) Inventors: Yi-Chien Chen, Tu-Chen (TW); Jain Chung Wang, Tu-chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 10/404,687

(22) Filed: Mar. 31, 2003

(65) Prior Publication Data

US 2004/0128380 A1 Jul. 1, 2004

(30) Foreign Application Priority Data

Dec. 27, 2002 (TW) .............................. 91137607 A

(51) Int. Cl.
*G06F 15/13* (2006.01)
(52) U.S. Cl. ...................... 709/218; 709/223; 709/242; 705/7
(58) Field of Classification Search ................. 709/218, 709/223, 242; 705/7
See application file for complete search history.

(56) References Cited

U.S. PATENT DOCUMENTS

| | | | | |
|---|---|---|---|---|
| 6,108,637 A | * | 8/2000 | Blumenau | 705/7 |
| 6,578,086 B1 | * | 6/2003 | Regan et al. | 709/242 |
| 6,892,227 B1 | * | 5/2005 | Elwell et al. | 709/218 |
| 2001/0044840 A1 | * | 11/2001 | Carleton | 709/223 |
| 2002/0123863 A1 | * | 9/2002 | Sato | 702/188 |

FOREIGN PATENT DOCUMENTS

JP 9-18478 1/1997
TW 511359 11/2002

* cited by examiner

*Primary Examiner*—Jinsong Hu

(57) ABSTRACT

A port information display system includes an administrative workstation (2) and a plurality of network devices (6). The administrative workstation can obtain and display information on ports of the network devices in real time. The administrative workstation includes: a network monitoring module (22) for obtaining information on ports of the network devices; a database (24) for storing information on the ports of the network devices; a plurality of port information pages (28), each port information page corresponding to a respective one of the network devices and including a current event bar (286) for conveniently displaying event information on one or more ports of the respective network device; and a port information display module (26) for determining whether information on ports of the network devices constitutes one or more events according to definitions stored in the database, and for displaying event information in real time.

14 Claims, 5 Drawing Sheets

SYSTEM AND METHOD FOR DISPLAYING INFORMATION ON PORTS OF NETWORK DEVICES

BACKGROUND OF THE INVENTION

1. Field of the Invention

The present invention relates to computer network administration systems and methods, and particularly to a port information display system and method which can instantly display information on ports of network devices.

2. Background of the Invention

With the rapid development of networking technology in the late 1980s and in the 1990s, more and more sub-networks are being used in organizations. It is becoming increasingly important to monitor network activities in such organizations. With increasing amounts of networking and mainframes in a network, it is becoming more difficult for professionals to effectively administer the network. Comprehensive standards and effective methods are needed for proper administration of the network.

In general, a network management application displays a graphical image of a front panel of a network device on a display monitor. The image may include items such as management of a layer 2/layer 3 switch, router or hub. Clicking on a display icon that represents a port selects rudimentary information on that port or an action to be performed for that port. Generally, no further information on the port is obtained by clicking on the icon.

It is necessary or at least useful to monitor a port's speed, duplex status, and traffic volume status. To do so by conventional means, a port information page must be separately opened. In addition, conventional means do not provide automatic notification when a port changes to a lower speed or carries unduly heavy traffic. Timely notice is needed so that any system problems can be attended to as soon as possible.

SUMMARY OF THE INVENTION

Accordingly, an object of the present invention is to provide a port information display system and method which displays comprehensive port information on network devices in real time, the port information comprising port performance and event information.

To achieve the above-mentioned object, a port information display system in accordance with a preferred embodiment of the present invention comprises: a plurality of network devices each comprising a plurality of ports, each port being linked to a terminal device; an administrative workstation for obtaining and displaying information on the ports of the network devices; and a connection connecting the administrative workstation and the network devices. The administrative workstation comprises: a network monitoring module for obtaining information on the ports of the network devices; a database for storing information on the ports of the network devices, and for storing display definitions which define display modes of simulated light emitting diodes (LEDs) representing ports, said definitions comprising colors corresponding to different traffic volume statuses and image configurations that respectively represent two duplex statuses; a plurality of port information pages, each port information page corresponding to a respective one of the network devices and comprising a current event bar for displaying event information on ports of the respective network device in real time; and a port information display module for determining whether information on ports of the network devices comprises one or more events according to definitions stored in the database, and for displaying event information in the current event bar in real time.

Further, the present invention provides a port information display method implemented in a networking infrastructure which comprises an administrative workstation and a plurality of network devices. The method comprises the steps of: (a) obtaining information on ports of each of the network devices; (b) storing the information on ports in a database; (c) displaying information on port performance; (d) determining whether the information on ports comprises one or more events; and (e) displaying event information in real time, if said information on ports comprises one or more events.

Other objects, advantages and novel features of the present invention will be drawn from the following detailed description of the present invention with the attached drawings, in which:

DETAILED DESCRIPTION OF THE INVENTION

Figure 1:
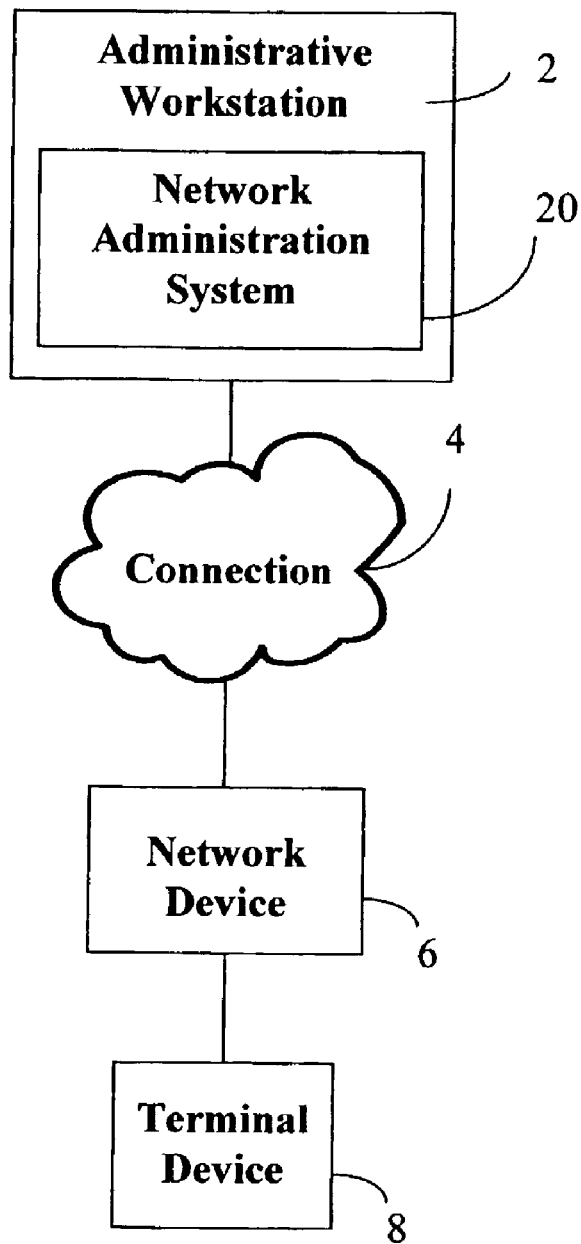
FIG. 1 is a simplified, schematic diagram of infrastructure of a port information display system in accordance with the preferred embodiment of the present invention, the port information display system comprising an administrative workstation, a network administration system and a network device.

FIG. 1 is a simplified, schematic diagram of infrastructure of a port information display system in accordance with a preferred embodiment of the present invention. The port information display system comprises: a plurality of network devices 6 (only one shown) comprising a plurality of ports (not shown), each port being linked to a terminal device 8 (only one shown); an administrative workstation 2 for obtaining and displaying information on the ports of the network devices 6; and a connection 4 connecting the administrative workstation 2 and the network devices 6. The administrative workstation 2 comprises a mainframe or a server, and a network administration system 20. Each network device 6 may be a switch, a router or a hub. Port information comprises port performance and event information. Port performance comprises a name of the relevant network device 6, a port number, a transmission speed, a traffic volume status, and a duplex status. The traffic volume status may be low, medium, or high. The duplex status may be full duplex or half duplex. Event information comprises pre-defined changes in port performance and alterations in topology of the connection 4. Each terminal device 8 may be a server, a computer workstation, a printer or a fax coupled to a network, or a UPS (Uninterrupted Power Supply). The connection 4 may the Internet or an intranet, or may have a ring topology, a bus topology, a tree topology or a hybrid topology.

Figure 2A:
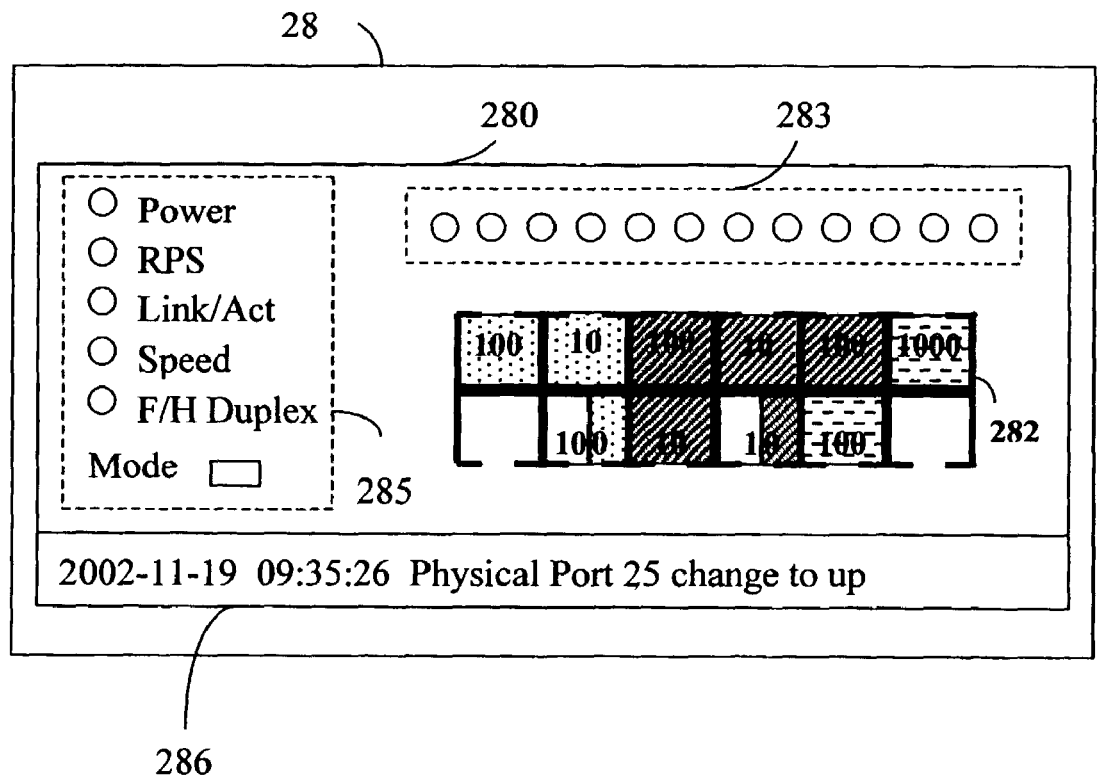
FIG. 2A schematically illustrates part of an exemplary port information page that can be displayed by the administrative workstation of FIG 1.
Figure 2B:
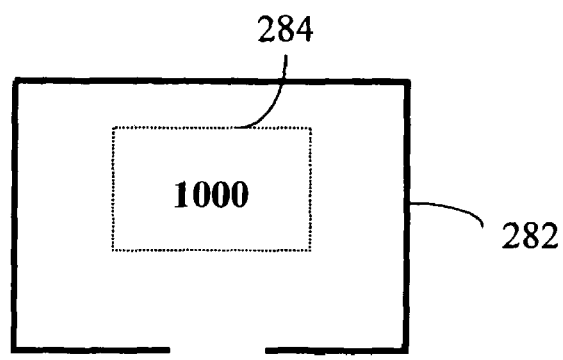
FIG. 2B is an enlarged view of one port icon shown in FIG. 2A.

FIG. 2A schematically illustrates part of an exemplary port information page 28 that can be displayed by the administrative workstation 2. The administrative workstation 2 can simultaneously provide a plurality of port information pages 28, each of which corresponds to a respective one of the network devices 6. Each port information page 28 is used for conveniently displaying information on ports of the respective network device 6. The port information page 28 comprises: a simulative FIG. 280, and a current event bar 286 below the simulative FIG. 280. The simulative FIG. 280 is for simulating a front panel of the relevant network device 6, and for displaying information on ports of the network device 6. The simulative FIG. 280 comprises a plurality of port icons 282, a plurality of simulated LEDs (light emitting diodes) 283 representing ports, and a basic information column 285. Each port icon 282 can display a traffic volume status and a duplex status for the corresponding port, respectively with different colors and image configurations. The colors and images configurations can be pre-defined by administrators of the port information display system. In the preferred embodiment, three traffic volume statuses are defined (low, medium, and high), each having a unique color. Full duplex status is represented by an undivided port icon 282, and half duplex status is represented by the port icon 282 being vertically divided down its middle. FIG. 2B is an enlarged view of one of the port icons 282 of FIG. 2A. A port speed display 284 displays a port speed in the port icon 282. Other information on port performance can be obtained by clicking on the relevant port icon 282. Each port LED 283 corresponds to one port of the network device 6, and displays a working status, a transmission speed or a duplex status for the corresponding port. The working status may be link down, link up, port active or port blocked.

The basic information column 285 displays some basic information on the relevant network device 6, and also displays mode settings for the port LEDs 283. In the preferred embodiment, the basic information comprises two simulated system LEDs called "Power" and "RPS" (redundant power supply). Three simulated mode LEDs are provided for indicating any of three display modes of the port LEDs 283, and a mode icon is provided for selecting any one of the three mode LEDs. The three display modes of the port LEDs 283 are called "Link/Act," "Speed," and "F/H Duplex" (full or half duplex), and respectively correspond to a working status, a transmission speed and a duplex status. The administrator can click on the mode icon to select any one of the three display modes for the port LEDs 283.

The current event bar 286 displays event information on the network device 6 in real time. Event information comprises a date, a time and basic information on an event.

Figure 2C:
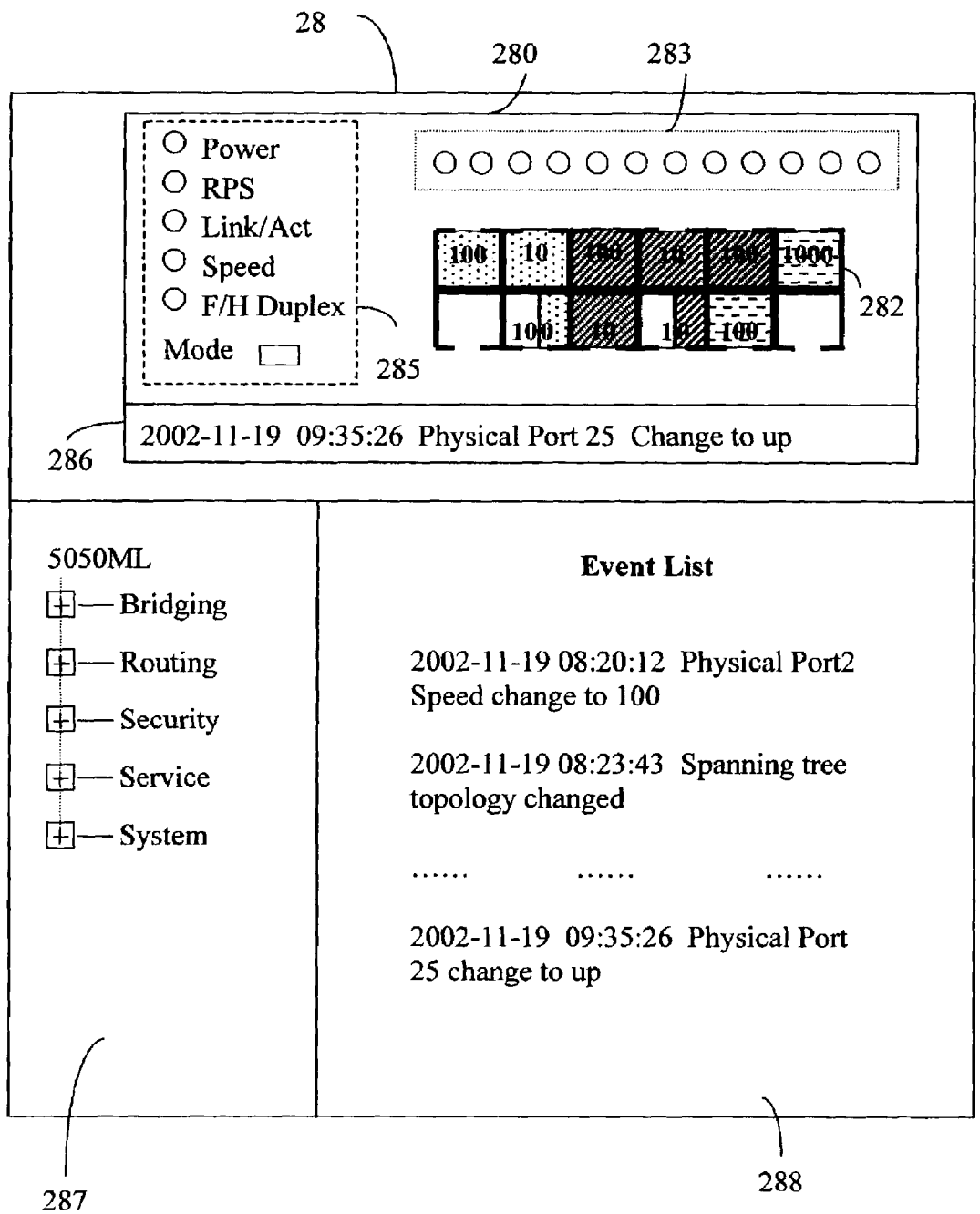
FIG. 2C schematically illustrates an entirety of the exemplary port information page of FIG. 2A.

FIG. 2C schematically illustrates an entirety of the exemplary port information page 28 of FIG. 2A. The port information page 28 further comprises an operation selection column 287 and an information column 288 both below the current event bar 286. Through the operation selection column 287, the administrator can configure basic data on bridging, routing, security, service and other system settings for the network device 6. The information column 288 is used for displaying said basic data, port performance details obtained by clicking on a corresponding port icon, and event information. In FIG. 2C, an Event List of recent events is shown.

Figure 3:
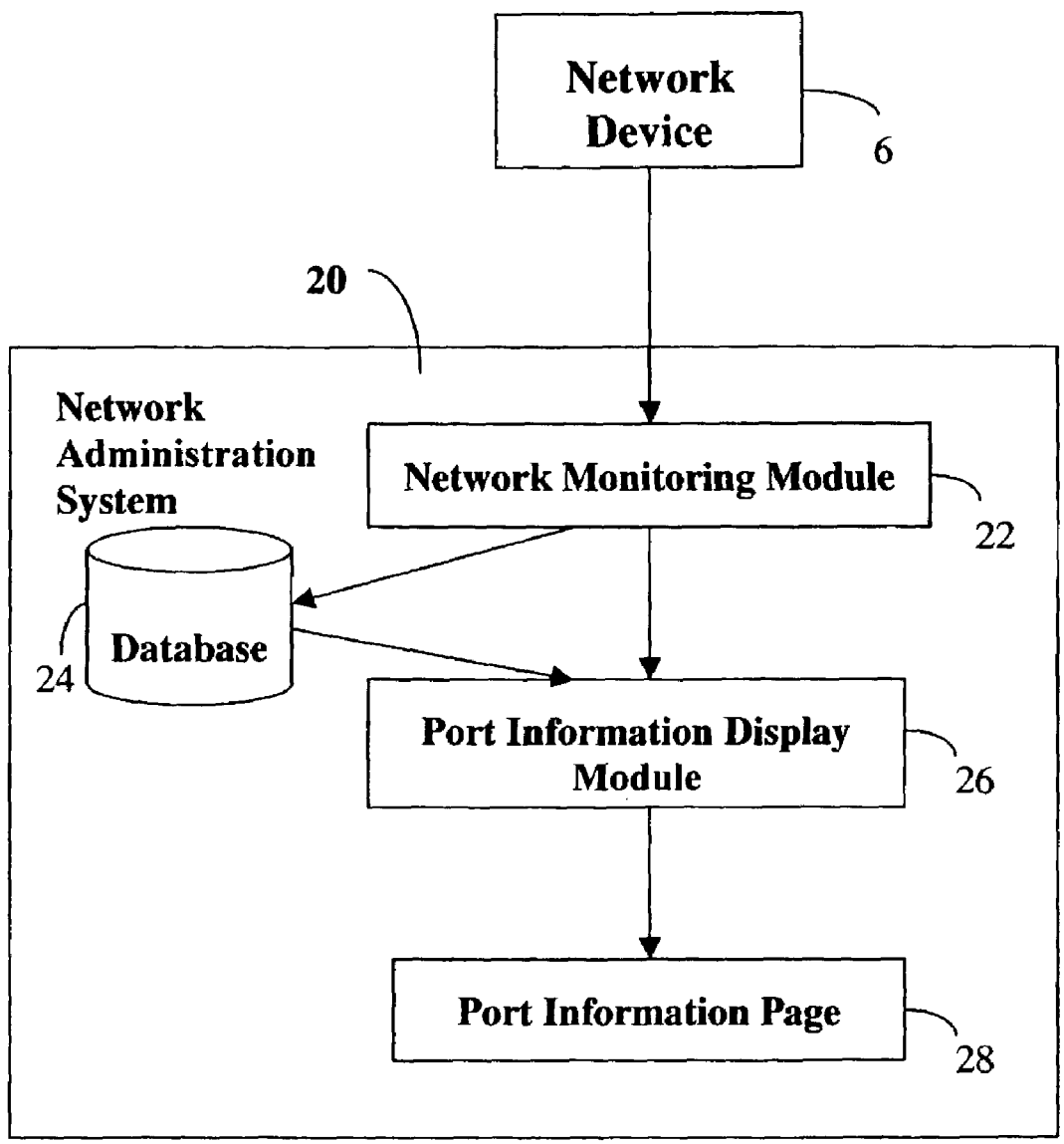
FIG. 3 is a schematic diagram of infrastructure of the network administration system of FIG. 1, and showing connection of the network administration system with the network device.

FIG. 3 is a schematic diagram of infrastructure of the network administration system 20 of FIG. 1, and showing connection of the network administration system 20 with the network device 6. The network administration system 20 comprises a network monitoring module 22, a database 24, a port information display module 26, and a plurality of port information pages 28 (only one shown). The network monitoring module 22 is for obtaining information on ports of the network devices 6, and comprises suitable monitoring software. In the preferred embodiment, said information on ports includes, for each port, a port speed, a traffic volume, and a duplex status. Said information on ports may be obtained by periodically accessing the network devices 6. Alternatively, said information on ports may be sent by any network device 6 when an event occurs at a port of the network device 6, or when the topology of the connection 4 (see FIG. 1) is changed. The database 24 is for storing information on all ports of the network devices 6, and for storing display definitions. The display definitions define display modes of the port LEDs 283, colors corresponding to different traffic volume statuses, and image configurations that respectively represent the two duplex statuses. For each port, the port information display module 26 computes a ratio of traffic volume based on a current traffic volume of the port and the port speed (see below). Then for that port, the port information display module 26 displays a traffic volume status based on the ratio of traffic volume, and a duplex status. In the preferred embodiment, the port information display module 26 computes the ratio of the traffic volume, obtains information on display definitions for ports according to the ratio of traffic volume and the duplex status by accessing the database 24, and displays the traffic volume status and the duplex status according to the display definitions, and also displays the port speed. That is, the port information display module 26 displays the port performance in the corresponding port icon 282 of the port information page 280. The port information display module 26 also determines whether information on ports of the network devices 6 comprises one or more events, and displays event information in the current event bar 286 in real time.

Figure 4:
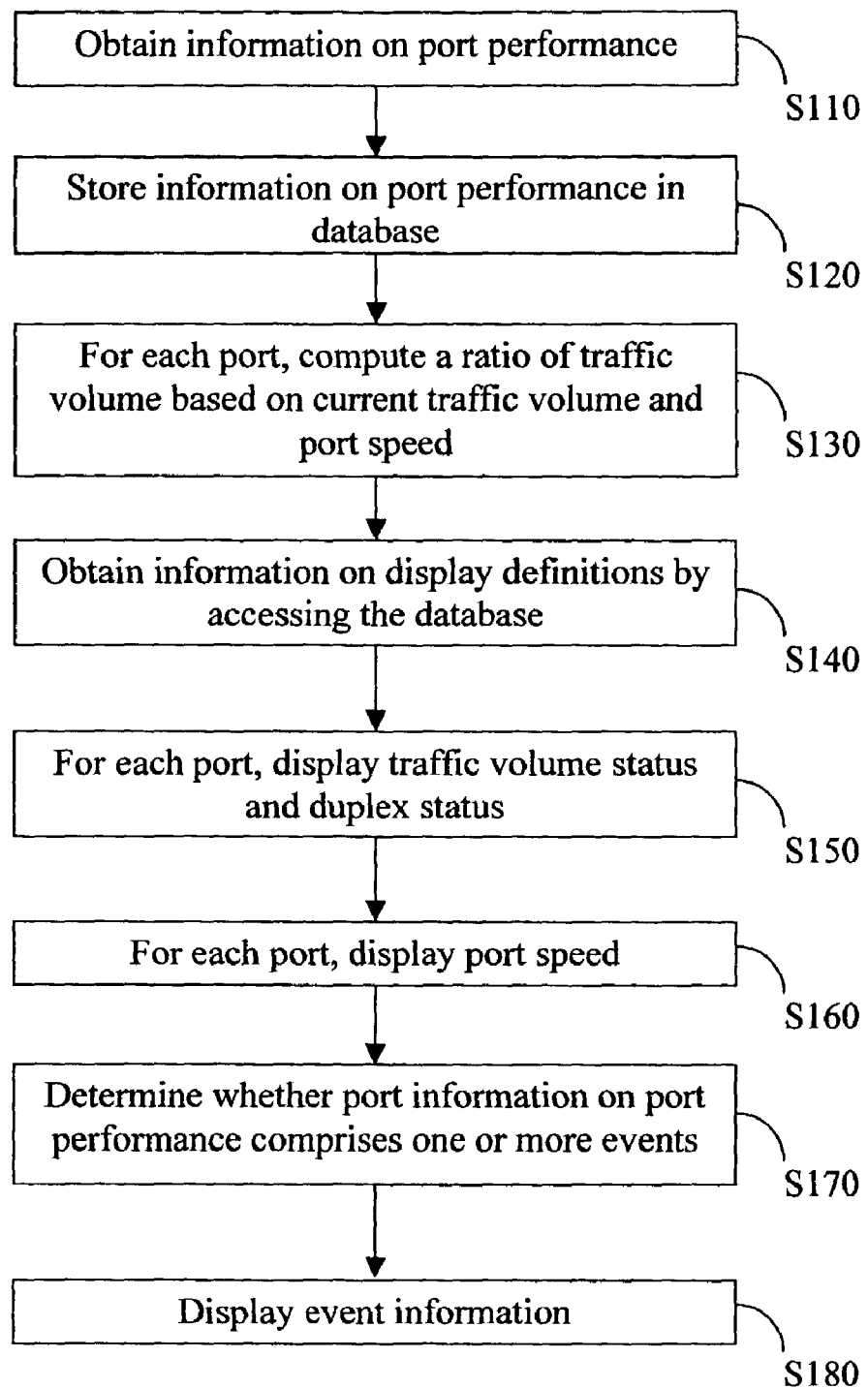
FIG. 4 is a flowchart of a preferred method for implementing the port information display system of the present invention.

FIG. 4 is a flowchart of a preferred method for implementing the port information display system of the present invention. In step S110, the network monitoring module 22 obtains information on port performance for each port of each of the network devices 6. In step S120, the network monitoring module 22 stores the information on port performance in the database 24. In step S130, for each port, the port information display module 26 computes a ratio of traffic volume based on a current traffic volume and a port speed. The equation for computing is; ratio of traffic volume=current traffic volume/port speed. In step S140, the port information display module 26 obtains information on display definitions for ratios of traffic volume and duplex statuses, by accessing the database 24. In step S150, for each port, the port information display module 26 displays a traffic volume status and a duplex status with a corresponding color and a corresponding image configuration in the corresponding port icon 282, based on the information on display definitions. In step S160, for each port, the port speed is displayed in the port speed display 284 of the corresponding port icon 282. In step S170, the port information display module 26 determines whether the information on ports of the network devices 6 comprises one or more events. That is, the port information display module 26 compares the traffic volume status, duplex status, and port speed with a reference traffic volume status, duplex status, and port speed stored in the database 24, and determines whether any events have occurred according to such comparison and the pre-defined changes stored in the database 24. If said information on ports comprises one or more events, in step S180, the port information display module 26 immediately displays event information in the current event bar 286.

The event information comprises any part of the data used in making the comparison and determination described above in relation to step S170.

In general, the port information display system and method of the present invention may take forms other than what is described above. While preferred embodiments for carrying out the invention have been described in detail, those familiar with the art to which the invention relates will recognize various alternative designs and embodiments for practicing the invention. These alternative embodiments are within the scope of the present invention. The scope of the present invention is defined by the claims appended hereto and allowable equivalents thereof.

What is claimed:

1. A port information display system implemented in a networking infrastructure comprising an administrative workstation and a plurality of network devices, the administrative workstation comprising:
   a network monitoring module for obtaining information on ports of the network devices;
   a database for storing information on the ports of the network devices, wherein the information on each of the ports comprises a port speed, a traffic volume, and a duplex status;
   a plurality of port information pages, each of the port information pages corresponding to a respective one of the network devices and comprising a current event space for displaying event information on one or more ports of the respective network device; and
   a port information display module for computing a ratio of traffic volume for each port based on a current traffic volume and a port speed, displaying a traffic volume status for the port based on the ratio of traffic volume and displaying a duplex status of the port, determining whether the information on the ports comprises one or more events, and displaying event information corresponding to the one or more events in real time.

2. The system according to claim 1, wherein each of the network devices comprises a switch, a router or a hub.

3. The system according to claim 1, wherein the information on the ports comprises port performance and event information, and the port performance for each port comprises the port speed, the traffic volume status, and the duplex status.

4. The system according to claim 1, wherein the database is further used for storing display definitions which define display modes of simulated light emitting diodes representing the ports, colors corresponding to different traffic volume statuses, and image configurations that respectively represent different duplex statuses; and the port information display module is also for obtaining information on display definitions for ports according to, for each port, the ratio of traffic volume and the duplex status by accessing the database, displaying the traffic volume status corresponding to the ratio of traffic volume and the display definitions and displaying the duplex status according to the display definitions, and displaying the port speed.

5. The system according to claim 1, wherein each of the port information pages further comprises a simulative figure for simulating a front panel of a respective network device, and for displaying information on ports of the network device, the simulative figure comprising a plurality of port icons for displaying the traffic volume statuses and the duplex statuses for corresponding ports respectively with different colors and image configurations.

6. The system according to claim 5, wherein each of the port icons has a port speed display for displaying a port speed.

7. The system according to claim 1, wherein each of the port information pages further comprises an operation selection space for an administrator to maintain basic data on bridging, routing, security, service and other system settings for the network devices.

8. The system according to claim 1, wherein each of the port information pages further comprises an information space for displaying basic data, port performance details, and event information details.

9. The system according to claim 1, wherein the ratio of traffic volume equals the current traffic volume divided by the port speed.

10. A port information display method implemented in a networking infrastructure which comprises an administrative workstation and a plurality of network devices, the method comprising:
    obtaining information on ports of each of the network devices, wherein the information on each of the ports comprises a port speed, a traffic volume, and a duplex status;
    storing the information on the ports in a database;
    computing a ratio of traffic volume for each port based on a current traffic volume of the port and a port speed of the port;
    displaying a traffic volume status for each port based on the ratio of traffic volume and displaying the duplex status of the port;
    determining whether the information on the ports comprises one or more events; and
    displaying event information in real time, if said information on the ports comprises one or more events.

11. The method according to claim 10, wherein displaying the traffic volume status for each port based on the ratio of traffic volume and displaying the duplex, status of the port comprises:
    obtaining information on display definitions for ratios of traffic volume and duplex statuses by accessing the database;
    for each of the ports, displaying the traffic volume status and the duplex status respectively with a corresponding color and a corresponding image configuration; and
    for each of the ports, displaying the port speed.

12. The method according to claim 10, wherein displaying the traffic volume status for each port based on the ratio of traffic volume and displaying the duplex status of the port comprises displaying information on port performance by clicking on a selected port icon.

13. The method according to claim 10, wherein the ratio of traffic volume equals the current traffic volume divided by the port speed.

14. A method of monitoring a network system, comprising:
    obtaining information on each of ports of the network system, wherein the following actions are performed for each of at least one of the ports;
    computing a ratio of traffic volume based on a current traffic volume and a port speed;
    displaying a traffic volume status based on the ratio of the traffic volume and displaying a duplex status and a speed status;
    comparing the traffic volume, duplex and speed statuses with reference traffic volume, duplex and speed statuses in order to see determine whether any one or more pre-defined changes have occurred; and
    automatically displaying event information corresponding to said one or more pre-defined changes if any said one or more defined changes have occurred.

* * * * *